United States Patent [19]

Suenaga et al.

[11] Patent Number: 5,478,657
[45] Date of Patent: Dec. 26, 1995

[54] TITANIUM DISCS USEFUL FOR MAGNETIC DISCS

[75] Inventors: Hiroyoshi Suenaga; Iwao Ida; Hitoshi Nagashima; Masanori Ohmura, all of Tokyo; Naoto Kohshiro; Noboru Kurata, both of Matsumoto, all of Japan

[73] Assignees: NKK Corporation, Tokyo; Fuji Electric Co., Ltd., Kawasaki, both of Japan

[21] Appl. No.: 254,279

[22] Filed: Jun. 6, 1994

[30] Foreign Application Priority Data

Jun. 16, 1993 [JP] Japan ................... 5-144769

[51] Int. Cl.$^6$ ........................................ G11B 5/82
[52] U.S. Cl. ..................... 428/612; 428/660; 428/687; 428/928; 428/694 SG
[58] Field of Search ................... 428/660, 687, 428/928, 694 SG, 694 ST, 612, 680, 611

[56] References Cited

U.S. PATENT DOCUMENTS

| | | | |
|---|---|---|---|
| 4,990,362 | 2/1991 | Kibe et al. | 204/192.2 |
| 5,017,337 | 5/1991 | Nabae et al. | 428/687 |
| 5,114,437 | 5/1992 | Takeuchi et al. | 51/293 |
| 5,120,615 | 6/1992 | Fukai et al. | 427/129 |
| 5,126,179 | 6/1992 | Inagaki | 428/694 ST |
| 5,131,995 | 7/1992 | Suenaga et al. | 204/192.2 |
| 5,136,819 | 8/1992 | Takagi et al. | 51/281 R |
| 5,159,787 | 11/1992 | Suenaga et al. | 51/326 |
| 5,188,677 | 2/1993 | Fukai et al. | 148/501 |
| 5,221,459 | 6/1993 | Okano et al. | 205/322 |
| 5,248,318 | 9/1993 | Tamamaki et al. | 51/309 |
| 5,360,677 | 11/1994 | Fukai et al. | 420/417 |

FOREIGN PATENT DOCUMENTS

| | | | |
|---|---|---|---|
| 553390A | 8/1993 | European Pat. Off. | 428/694 ST |
| 105804 | 9/1977 | Japan | G11B 5/62 |
| 222433 | 9/1987 | Japan | G11B 5/84 |
| 4-184713 | 7/1992 | Japan . | |
| 4-184711 | 7/1992 | Japan . | |
| 4-248123 | 9/1992 | Japan | 428/694 ST |

OTHER PUBLICATIONS

Hirayama, *Metal Surface Technology*, 38:378–385 (1987) no month.
Ootaka et al., *Metal Surface Technology*, 38:554–560 (1987) no month.
Fukuni, eta l., *79th Seminar Report of Surface Technology Association*, pp. 230–231 (1989) no month.

*Primary Examiner*—John Zimmerman
*Attorney, Agent, or Firm*—Morgan & Finnegan

[57] ABSTRACT

The object of the present invention is to provide titanium discs to be used as high-density read-while-write magnetic discs. Further object of the present invention is to provide said titanium discs coated with a non-magnetic plated layer.

Titanium discs to be used as magnetic discs which satisfy the above object have the following structures: A titanium disc to be used as magnetic disc having the mean height of the peaks from the center line, $R_a$, of 0.0002 μm to 0.0060 μm and pits on its surface of 25 μm or less in diameter or 5 μm or less in depth. Further, said titanium disc to be used as a magnetic disc is coated with a non-magnetic plated layer with a thickness of 0.09 μm to 5 μm. Moreover, a titanium disc that is most suitable to be used as a magnetic disc is the titanium disc provided with a plated layer of 30/100 or less in a knife-cut peeling test.

3 Claims, No Drawings

TITANIUM DISCS USEFUL FOR MAGNETIC DISCS

BACKGROUND OF THE INVENTION

1. Field of the Invention

The present invention relates to titanium discs which are useful for the production of high-density read-while-write magnetic discs.

2. Description of the Related Art

Aluminum discs have been widely used to produce magnetic discs. However, there has been an increasing need to increase the recording density of magnetic discs and reduce its thickness. To meet these requirements, attempts have been made to use titanium, which has excellent heat resistance and rigidity, as a new material for magnetic discs in the place of aluminum. See Japanese Patent Application Laid Open No. 105804/1977. However, the uneven crystalline surface of polycrystalline titanium is reflected through the magnetic layer provided as the recording medium, and causes frequent signal errors.

The inventors of the present invention have found an effective means to prevent such errors by coating the disc surface with an amorphous anodic oxidation layer. However, evaluation of the properties of the titanium magnetic discs coated with an amorphous anodic oxidation layer shows that there is insufficient stability when texturing the anodic oxidation layer. This in turn causes inconsistency in the "Contact Start Stop" property, also known as the CSS property, of such discs. The CSS property is the variation of the friction between a magnetic head and a disc when the head is on and off the disc.

Texturing is a process by which the surface of a disc is roughened to form minute irregularities as concentric circles in the direction of the diameter of the disc. Texturing is used to overcome the problem of contamination of the disc surface by water and/or lubricant absorbed on the magnetic head when it is caused to stop on the magnetic disc surface. This problem arises because the surfaces of the thin layered magnetic discs, such as sputtered or plated discs, are much finer than conventional magnetic discs, and is easily marred by contamination.

One method of providing such irregularities is by tape texturing wherein the minute irregularities are formed, for an example, by spinning the disc at 50 rpm while a 2 inches wide polyethylene tape provided with abrasive particles of white alumina having an average diameter of 6 μm is pressed onto the disc surface and is moved in the radial direction of the disc at 800 mm/min.

It is, therefore, important to provide a surface that can be stably textured. This has been a major obstacle in producing titanium magnetic discs.

Non-electrolytic plating with Ni-P is well known to be effective for surface treating aluminum alloy discs and has been used widely on an industrial scale. Such nonelectrolytic plating provides a variety of properties to the aluminum alloy discs. See Yoshio Hirayama: Metal Surface Technology, Vol. 38, p. 378/1987. Texturing of the nonelectrolytic Ni-P plated layer on the aluminum alloy disc is also well established, from which satisfactory CSS property has been obtained.

The thickness of a Ni-P plated layer on an aluminum alloy disc should be between 15 and 20 μm, of which approximately 5 μm is removed by polishing to improve the surface roughness. See Japanese Patent Application Laid Open No. 222433/1987. As a result, a plated layer with a thickness of 10 to 15 μm on the finished product is provided. This thickness is required to provide sufficient rigidity to the comparatively soft aluminum alloy discs and at the same time achieve satisfactory CSS property. However, it takes approximately 120 minutes to form a Ni-P plated layer with a thickness of 15~20 μm. Moreover, when a Ni-P plated layer of 15~20 μm is formed, the surface roughness represented by $R_a$, as specified in JIS B0601, may reach as high as approximately 0.5 μm. It is necessary, therefore, to polish the surface of the disc after it is plated with Ni-P as reported in Japanese Patent Application Laid Open No. 222433/1987. The time taken to plate the aluminum disc and the subsequent polishing required have been the major obstacles in producing inexpensive aluminum alloy discs. See Tetsuo Otaka et al., Metal Surface Technology, Vol. 38, p. 554 (1987).

Here, $R_a$ is a measure of the roughness of a surface and is defined as the mean height of the peaks from an imaginary center line, where roughness is represented by peaks and valleys on a surface. It is represented by the equation:

$$R_a = \frac{1}{l} \int_0^l |f(x)| dx$$

l: is a standard length of about 250 μm to 800 μm and is sufficiently large to include peaks and valleys so that $R_a$ represents a surface roughness.

The center line is so drawn that the area covered by the peaks above the line and area covered by the valleys under the line is equal. The equation for the center line is as follows:

$$\int_0^l f(x) dx_{(above)} = -\int_0^l f(x) dx_{(under)}$$

When $R_a$ is as high as 0.5 μm, a final polishing is required. However, this final polishing causes defects and reduces the quality of the finished product.

It would be desirable to provide a titanium disc having the desirable properties to be used as a base disc, and a titanium disc having a non-magnetic plated layer thereon. A titanium base disc useful to produce a magnetic disc according to the present invention is to have a desirable surface roughness so that the titanium disc can be plated with a highly adhesive plated layer. It is also desirable to provide a titanium disc useful as a magnetic disc having sufficient thickness of the plated layer to allow texturing of its surface.

However, titanium is known to be difficult to plate, and attempts to form a strongly adhesive plated layer on the mirror-like surface of the titanium disc have not been successful. An effective means to form a highly adhesive plated layer is to roughen the surface of the titanium. See the 79th Seminar Report of the Surface Technology Association p. 230 (1989). However, the increased surface roughness makes re-polishing of the plated layer inevitable. Therefore, this process has been inappropriate for production on an industrial scale.

Therefore, the first object of the present invention is to provide a titanium disc on which a highly adhesive plated layer can be formed.

The second object of the present invention is to provide a magnetic disc having a plated layer with an appropriate thickness. This avoids the increased residual stress caused by depositing the magnetic layer by sputtering, as the thickness of the plated layer increases. The residual stress in the plated layer causes exfoliation of the plated layer. Further, excessive thickness of the plated layer also results in inferior surface roughness which in turn requires surface finishing by polishing after the disc is plated.

Thus, a further object of the present invention is to provide a titanium disc with a desirable plated layer.

The present invention provides a titanium disc having a plated layer which does not exfoliate when a magnetic layer is formed by a sputtering process. Moreover, the process provides a minimum thickness of the plated layer such that the surface of the titanium disc is not exposed when texturing is done on the plated layer.

SUMMARY OF THE INVENTION

As described above, an object of the present invention is to provide a titanium disc with a desirable surface roughness and minimum defects which will be useful as a magnetic disc. A further object of the present invention is to provide a titanium disc coated with a plated layer with a desired thickness. More specifically, a titanium disc useful for the production of a magnetic disc according to the present invention has the following properties:

(a) A surface roughness, $R_a$, defined as the mean height of peaks from the center line, just before coating with a plated layer, of between 0.0002 and 0.0060 µm, and;

(b) having pits of 25 µm or less in diameter and 5µm or less in depth.

The invention is further directed to a titanium disc useful as a magnetic disc wherein the surface of the titanium disc described above is coated with a non-magnetic plated layer with a thickness of 0.09~5 µm.

The invention is further directed to a titanium disc useful as a magnetic disc wherein the titanium disc described above is coated with a non-magnetic plated layer with a thickness of 0.09~5 µm; and an adhesion of 30/100 or less when evaluated by a knife-cut peeling test according to JIS H 8602.

PREFERRED EMBODIMENT OF THE PRESENT INVENTION

Materials

Both pure titanium and titanium alloys including cp titanium, Ti-5Al-2.5Sn, Ti-6Al-4V specified in JIS are useful for the present invention. These pure titanium and titanium alloy are non-magnetic and have excellent strength. Because of these desirable properties, they can be processed to be a thin plate with a thickness of 1 mm or less, suitable for the manufacture of thin magnetic discs.

Surface Roughness of the Disc

Surface roughness of the disc is a critical factor of a magnetic disc. In terms of the surface roughness, the mean height of the peaks from the center line, $R_a$, is between 0.0002 µm and 0.0060 µm. When $R_a$ is less than 0.0002 µm, the surface of the titanium disc is almost mirror-like, and a plated layer with sufficient adhesion necessary for the present invention cannot be obtained. On the other hand, the upper limit of $R_a$ is set at 0.0060 µm for the following reason. A plated layer on the titanium disc by the present invention is too thin to even out the surface roughness of the titanium disc. Thus, $R_a$ of the titanium disc itself should be at a level suitable for a magnetic disc. The $R_a$ of magnetic discs currently being produced is 0.0060 µm after texturing. Therefore, the upper limit of $R_a$ should be at 0.0060 µm.

Size of a Pit on the Disc

There are limits on the size of pits that appear on the surface of a titanium disc because the presence of pits cause electric noise. Pits appear even when a titanium disc is mirror-polished. The depth of a pit is normally ⅕ of its diameter. Pits on a titanium base disc of 25 µm or less in diameter or 5 µm or less in depth can be repaired by plating. Therefore, any pits which appear on a titanium base disc must be 25 µm or less in diameter or 5 µm or less in depth.

Process for Preparing Discs

A titanium disc having above-described properties can be produced by the following method.

A 0.8 mm thick cold-rolled titanium plate or titanium alloy plate is punched into discs. The discs are then hot-pressed, cut, ground and polished. The surface roughness is adjusted by polishing for a suitable period of time. Further, by choosing a suitable polishing media, the size and number of pits are adjusted to satisfy the criteria of the present invention. An example of a suitable polishing media is an aqueous suspension of $Al_2O_3$ in water. The $Al_2O_3$ may be obtained as Disklite® 1312 (Fujimi Abrasive Supply Co. Ltd.). The suspension is prepared by mixing 7.4 vol % of Disklite 1312 and 9.1 vol % hydrogen peroxide in water. A suitable period for polishing ranges from two to twenty minutes.

Types of Plating

Any non-magnetic plated layer having sufficient rigidity for texturing is useful as a plated layer on a titanium disc to be made into a magnetic disc. A non-magnetic plated layer is used so that a magnetic layer can be formed thereon. For this purpose, plating with Ni-P and Ni-Cu-P etc. are useful. The content of P and/or Cu is approximately 12% and 40% by weight, respectively. Such composition has been typically utilized for aluminum discs and can be applied to the titanium disc by the present invention.

Thickness of a Plated Layer

According to the present invention, the thickness of a non-magnetic plated layer on the titanium disc is in the range of 0.09 µm~5 µm.

The lower limit 0.09 µm is a minimum thickness required for a non-magnetic plated layer to remain on the disc after texturing having $R_a$ of 0.0060 µm. When $R_a$ is 0.0060 µm, the maximum roughness measured as $R_{max}$ after texturing is usually approx. 0.08 µm. At this lower limit of 0.09 µm, the titanium surface will not be exposed on texturing. $R_{max}$ is defined as the distance between the highest peak and the lowest valley from a mean line in a standard length (l). The mean line is so drawn that S, where S is the sum the square of the distance, d, above and under the line, i e $S=\Sigma(d_i)^2$, is at a minimum.

Likewise, the upper limit of the thickness of the plated layer is set at 5 µm. A plated layer with a thickness above this limit will exfoliate when the magnetic layer is deposited by sputtering. This is because heating involved in sputtering causes a residual stress in the plated layer which is in proportion to its thickness, and results in exfoliation of the plated layer. For the above reasons, thickness of the plated layer should be between 0.09~5 µm.

Plating Method

A titanium disc can be plated both electrolytically and non-electrolytically. The plated layer can be of any material as long as it is non-magnetic.

Adhesion of a plated Layer

According to the present invention, adhesion of a plated layer is required to be 30/100 or less in the knife cut peeling test according to JIS H8602. This is the minimum adhesion strength to avoid exfoliation of the plated layer while sputtering. The knife cut peeling is a test procedure used to evaluate adhesion of a plated layer to a metal surface. Using a knife eleven cuts at a distance of 1 mm are on the plated surface lengthwise and crosswise. A cellophane tape of 12 mm wide is placed on the cut surface and then removed to see how many of the cut sections are peeled off.

The adhesion of the plating to the metal was evaluated by using a knife-cut peeling test according to JIS H8602. An adhesion of 30/100 or less was deemed to pass the criteria. The surface roughness was evaluated by using the above-mentioned measuring device. Plated materials having an $R_a$ of 0.0060 μm or more was deemed to have failed. The results are shown in Table 1.

As shown in Table 1, adhesion of the plated layer to the titanium discs and the surface roughness after plating were satisfactory when the surface roughness was between 0.0002 and 0.0060 μm, and the thickness of the plated layer was between 0.09 and 0.5 μm.

TABLE 1

| No. | Material | $R_a$ (μm) | Thickness of plated layer (μm) | Adhesion of plated layer (*) | Surface Roughness after plating () | Evaluation (*) |
|---|---|---|---|---|---|---|
| 1 | cp Type 2 | 0.0001 | 0.05 | x | o | x |
| 2 | cp Type 2 | 0.0001 | 0.09 | x | o | x |
| 3 | cp Type 2 | 0.0001 | 5.0 | x | o | x |
| 4 | cp Type 2 | 0.0001 | 5.5 | x | x | x |
| 5 | cp Type 2 | 0.0001 | 10.0 | x | x | x |
| 6 | cp Type 2 | 0.00015 | 0.09 | x | o | x |
| 7 | Ti—5Al—2.5Sn | 0.00015 | 0.09 | x | o | x |
| 8 | Ti—6—Al—4V | 0.00015 | 0.09 | x | o | x |
| 9 | cp Type 2 | 0.00020 | 0.05 | o | o | x |
| 10 | cp Type 2 | 0.00020 | 0.08 | o | o | x |
| 11 | cp Type 2 | 0.00020 | 0.09 | o | o | o |
| 12 | cp Type 2 | 0.00020 | 2.0 | o | o | o |
| 13 | cp Type 2 | 0.00020 | 5.0 | o | o | o |
| 14 | cp Type 2 | 0.00020 | 5.5 | x | x | x |
| 15 | cp Type 2 | 0.00020 | 10.0 | x | x | x |
| 16 | Ti—5Al—2.5Sn | 0.00020 | 2.0 | o | o | o |
| 17 | Ti—6Al—4V | 0.00020 | 2.0 | o | o | o |
| 18 | cp Type 2 | 0.0060 | 0.09 | o | o | o |
| 19 | cp Type 2 | 0.0060 | 2.0 | o | o | o |
| 20 | cp Type 2 | 0.0060 | 5.0 | o | o | o |
| 21 | cp Type 2 | 0.0060 | 5.5 | x | x | x |
| 22 | cp Type 2 | 0.0060 | 10.0 | x | x | x |
| 23 | Ti—5Al—2.5Sn | 0.0060 | 2.0 | o | o | o |
| 24 | Ti—6Al—4V | 0.0060 | 2.0 | o | o | o |
| 25 | Ti—6Al—4V | 0.0060 | 5.5 | x | x | x |

(*) According to JIS H8602
(**) According to JIS B0601
(***) o = passed; x = not passed The present invention provides a desirable titanium disc just before plating for the manufacture of a magnetic disc. The present invention further provides a titanium magnetic disc having a plated layer with desirable thickness and adhesion.

EXAMPLE 1

Relationship between the surface roughness of various titanium discs and adhesion was investigated. cp Type 2 pure titanium, Ti-5Al-2.5Sn alloy, and Ti-6Al-4V alloy discs were used. The discs were of 2.5 inches in diameter and 0.6 mm in thickness and plated non-electrolytically with Ni-12wt % P. $R_a$, the mean height of the peaks from the center line of the materials used were between 0.0001 μm and 0.0060 μm. The thickness of the plated layer formed was between 0.05 and 10 μm.

In the Examples, surface roughness was measured by using "ET-30HK" a non-contacting measuring device for micro surface irregularity utilizing a laser-beam emitted by a semiconductor made by Kosaka Laboratory. The measurements were made with a 0.5 μm diamond contact needle was used and the measuring length was 250 μm.

EXAMPLE 2

The Maximum diameter of a pit repairable by plating was investigated. Titanium discs having pits of different size made of cp Type 2 pure titanium, Ti-5Al-2.5Sn alloy, and Ti-6Al-4V alloy, diameter: 2.5 inches, thickness: 0.6 mm, were plated non-electrolytically with Ni-12wt % P. The $R_a$ of the titanium disc was 0.0002 μm; Diameters of the pits were between 5 and 30 μm; and the thickness of the plated layer was 5 μm. A differential interference contrast microscope was used to investigate if the pits were repaired after a plated layer was formed. Titanium discs on which traces of pits were observed were deemed to have failed the criteria. The results in Table 2 show that pits were repaired satisfactorily when a pit on the disc was 25 μm or less in diameter.

TABLE 2

| No. | Material | Pit diameter of the material (μm) | Pit repaired (*) |
|---|---|---|---|
| 1 | cp Type 2 | 5 | o |
| 2 | cp Type 2 | 10 | o |
| 3 | cp Type 2 | 15 | o |
| 4 | cp Type 2 | 20 | o |
| 5 | cp Type 2 | 25 | o |

TABLE 2-continued

| No. | Material | Pit diameter of the material (μm) | Pit repaired (*) |
|---|---|---|---|
| 6 | cp Type 2 | 30 | x |
| 7 | Ti—5Al—2.5Sn | 10 | o |
| 8 | Ti—5Al—2.5Sn | 25 | o |
| 9 | Ti—5Al—2.5Sn | 30 | x |
| 10 | Ti—6Al—4V | 10 | o |
| 11 | Ti—6Al—4V | 25 | o |
| 12 | Ti—6Al—4V | 30 | x |

*o: Pits not observed by a differential interference contrast microscope
x: Pits observed by a differential interference contrast microscope

EXAMPLE 3

The state of a plated layer after texturing, and exfoliation of the plated layer after the plated layer was sputter-coated with a magnetic layer were investigated. Titanium discs made of cp Type 2 pure titanium, Ti-5Al-2.5Sn alloy, and Ti-6Al-4V alloy, diameter: 2.5 inches, thickness: 0.6mm were plated non-electrolytically with Ni-12wt % P. The $R_a$ of the titanium disc was set at two levels of 0.0002 μm and 0.0060 μm. Tape texturing was utilized with a #4000 alumina mono-layer tape to form a texture with an $R_a$ of 0.006 μm. A microscope was used to evaluate the state of the plated layer after the texturing. Texturing was followed by the deposition of a magnetic layer by sputtering under the following conditions:

Vacuum: 1×10⁻³ Torr

Disc temperature: 250° C.

Thickness of Cr base layer: 500 Å

Thickness of Co-containing magnetic layer: 600 Å

Thickness of carbon protection layer: 300 Å

Exfoliation of the plated layer after sputter-coating with a magnetic layer was investigated visually. As shown in Table 3, titanium metal was not exposed after texturing and the plated layer did not exfoliate after sputtering when the thickness of the plated layer was in the range of 0.09 to 5 μm.

EXAMPLE 4

Titanium discs made of cp Type 2 pure titanium, Ti-5Al-2.5Sn alloy, and Ti-6Al-4V alloy, diameter: 2.5 inches, thickness: 0.6 mm, were plated with plating having different adhesions. The $R_a$ of the titanium was in the range of 0.0001 μm to 0.0060 μm. Thickness of the plated layer was 2 μm. Discs were plated nonelectrolytically with Ni-12wt % P and Ni-Cu-P (Cu: 40 wt %, P: 12 wt %), and electrolytically with Ni-12 wt % P.

The adhesion of the plating to titanium discs was investigated by using a knife-cut peeling text according to JIS H8602, and evaluated by the number of peeled sections. Exfoliation of a plated layer after the magnetic layer was deposited by sputtering was observed visually. Sputtering was done under the following conditions:

Vacuum: 1×10⁻³ Torr

Disc Temperature: 250° C.

Thickness of Cr base layer: 500 Å

Thickness of Co-containing Magnetic layer: 600 Å

Thickness of carbon protection layer: 300 Å

As shown in Table 4, exfoliation of the plated layer after sputtering did not occur when the number of lattice patterns peeled was 30/100 or less.

TABLE 3

| No. | Material | $R_a$ (μm) | Thickness of plated layer (μm) | Titanium exposed | Exfoliation after sputtering | Evaluation (*) |
|---|---|---|---|---|---|---|
| 1 | cp Type 2 | 0.0002 | 0.05 | Yes | No | x |
| 2 | cp Type 2 | 0.0002 | 0.08 | Yes | No | x |
| 3 | cp Type 2 | 0.0002 | 0.09 | No | No | o |
| 4 | cp Type 2 | 0.0002 | 2.0 | No | No | o |
| 5 | cp Type 2 | 0.0002 | 5.0 | No | No | o |
| 6 | cp Type 2 | 0.0002 | 5.5 | No | Yes | x |
| 7 | cp Type 2 | 0.0002 | 10.0 | No | Yes | x |
| 8 | Ti—5Al—2.5Sn | 0.0002 | 0.09 | No | No | o |
| 9 | Ti—5Al—2.5Sn | 0.0002 | 2.0 | No | No | o |
| 10 | Ti—5Al—2.5Sn | 0.0002 | 5.5 | No | Yes | x |
| 11 | Ti—6Al—4V | 0.0002 | 0.08 | Yes | No | x |
| 12 | Ti—6Al—4V | 0.0002 | 2.0 | No | No | o |
| 13 | Ti—6Al—4V | 0.0002 | 5.0 | No | No | o |
| 14 | cp Type 2 | 0.0060 | 0.05 | Yes | No | x |
| 15 | cp Type 2 | 0.0060 | 0.08 | Yes | No | x |
| 16 | cp Type 2 | 0.0060 | 0.09 | No | No | o |
| 17 | cp Type 2 | 0.0060 | 2.0 | No | No | o |
| 18 | cp Type 2 | 0.0060 | 5.0 | No | No | o |
| 19 | cp Type 2 | 0.0060 | 5.5 | No | Yes | x |
| 20 | cp Type 2 | 0.0060 | 10.0 | No | Yes | x |

(*) o = passed
x = not passed

TABLE 4

| No. | Material | Plating method | # of peeled sections (*) | Exfoliation | Evaluation (**) |
|---|---|---|---|---|---|
| 1 | cp Type 2 | N.E.[a], Ni—12 wt % P | 73/100 | Yes | x |
| 2 | cp Type 2 | N.E., Ni—12 wt % P | 63/100 | Yes | x |
| 3 | cp Type 2 | N.E., Ni—12 wt % P | 53/100 | Yes | x |
| 4 | cp Type 2 | N.E., Ni—12 wt % P | 31/100 | Yes | x |
| 5 | cp Type 2 | N.E., Ni—12 wt % P | 24/100 | No | o |
| 6 | cp Type 2 | N.E., Ni—12 wt % P | 0/100 | No | o |
| 7 | cp Type 2 | N.E., Ni—Cu—P | 58/100 | Yes | x |
| 8 | cp Type 2 | N.E., Ni—Cu—P | 41/100 | Yes | x |
| 9 | cp Type 2 | N.E., Ni—Cu—P | 33/100 | Yes | x |
| 10 | cp Type 2 | N.E., Ni—Cu—P | 29/100 | No | o |
| 11 | cp Type 2 | N.E., Ni—Cu—P | 12/100 | No | o |
| 12 | cp Type 2 | E[b], Ni—12 wt % P | 68/100 | Yes | x |
| 13 | cp Type 2 | E., Ni—12 wt % P | 31/100 | Yes | x |
| 14 | cp Type 2 | E., Ni—12 wt % P | 27/100 | No | o |
| 15 | cp Type 2 | E., Ni—12 wt % P | 0/100 | No | o |
| 16 | Ti—5Al—2.5Sn | N.E., Ni—12 wt % P | 88/100 | Yes | x |
| 17 | Ti—5Al—2.5Sn | N.E., Ni—12 wt % P | 59/100 | Yes | x |
| 18 | Ti—5Al—2.5Sn | N.E., Ni—12 wt % P | 29/100 | No | o |
| 19 | Ti—5Al—2.5Sn | N.E., Ni—12 wt % P | 13/100 | No | o |
| 20 | Ti—6Al—4V | N.E., Ni—12 wt % P | 73/100 | Yes | x |
| 21 | Ti—6Al—4V | N.E., Ni—12 wt % P | 33/100 | Yes | x |
| 22 | Ti—6Al—4V | N.E., Ni—12 wt % P | 28/100 | No | o |
| 23 | Ti—6Al—4V | N.E., Ni—12 wt % P | 18/100 | No | o |

(*) Test results by JIS H8602
(**) o = Passed
x = not passed
[a] = non—electrolytic
[b] = electrolytic

What is claimed is:

1. An unplated titanium disc to be plated with a layer on a surface thereof and useful for making a magnetic disc having:
   (a) a surface roughness, $R_a$, defined as a mean height of the peaks from an imaginary center line on the surface, of said titanium disc just before plating of between 0.0002 and 0.0060 µm; and
   (b) the surface having pits wherein the size of the pits on the surface of said titanium disc being between 25 µm and 5 µm in diameter, up to 5 µm in depth.

2. An unplated titanium disc according to claim 1 further coated on its surface with a non-magnetic plated layer of 0.09~5 µm in thickness and wherein the adhesion of said non-magnetic plated layer to the titanium disc is 30/100 or less when evaluated by a knife-cut peeling test according to JIS H8602.

3. An unplated titanium disc coated on its surface with a non-magnetic plated layer according to claim 2, wherein said non-magnetic plated layer consists essentially of a Ni-P alloy and a Ni-Cu-P alloy.

* * * * *